United States Patent [19]
Tsai

[11] Patent Number: 5,504,286
[45] Date of Patent: Apr. 2, 1996

[54] MULTIPLE SWITCH ASSEMBLY INCLUDING A ROCKABLE CONTROL PLATE FOR SELECTIVELY ACTUATING MULTIPLE MICROSWITCHES

[75] Inventor: Gordon Tsai, Taipei Hsien, Taiwan

[73] Assignee: Shin Jiuh Corporation, Taipei Hsien, Taiwan

[21] Appl. No.: 321,735

[22] Filed: Oct. 12, 1994

[51] Int. Cl.$^6$ ............................ H01H 9/00; H01H 21/24; H01H 25/04

[52] U.S. Cl. ............................ 200/5 R; 200/6 A; 200/339; 200/557

[58] Field of Search ............................ 200/5 R, 5 A, 200/5 E, 5 EA, 5 EB, 6 A, 17 R, 18, 332, 339, 553, 557; 345/157, 160, 161; 364/188, 190; 273/433, 434, 438

[56] References Cited

U.S. PATENT DOCUMENTS

| | | | |
|---|---|---|---|
| 3,805,008 | 4/1974 | Kessler et al. | 200/332 |
| 4,429,200 | 1/1984 | Glenn et al. | 200/339 X |
| 4,476,356 | 10/1984 | Nakayama et al. | 200/6 A |
| 4,520,240 | 5/1985 | Swindler | 200/5 R |
| 5,038,086 | 8/1991 | Ahmed et al. | 318/286 |
| 5,213,204 | 5/1993 | Sommer | 200/5 R |
| 5,357,071 | 10/1994 | Hanaki | 200/557 |

Primary Examiner—J. R. Scott
Attorney, Agent, or Firm—Kinney & Lange

[57] ABSTRACT

A computer key includes a housing, a switch set and a control plate. The switch set includes first and second switches mounted spacedly in the housing. Each of the first and second switches has a top end with a push button that extends through the housing. The control plate extends above the first and second switches and has a pivot portion mounted pivotally to the housing. The pivot portion has a pivot axis disposed between the first and second switches. The control plate is operable so as to pivot relative to the housing to depress the push button of a selected one of the first and second switches.

9 Claims, 4 Drawing Sheets

MULTIPLE SWITCH ASSEMBLY INCLUDING A ROCKABLE CONTROL PLATE FOR SELECTIVELY ACTUATING MULTIPLE MICROSWITCHES

BACKGROUND OF THE INVENTION

1. Field of the Invention

The invention relates to a computer key, more particularly to a computer key which can function as two different keys.

2. Description of the Related Art

Portable computers which have a keyboard that incorporates a cursor pointing device, such as a trackball or a micro-joystick, are known in the art. Since each of the keys of the keyboard serves a particular purpose, it would be inadvisable to remove some of the computer keys so as to accommodate the cursor pointing device. Instead, the size of the computer keys is usually reduced so that a space can be allotted for the cursor pointing device. However, the size of the computer keys should not be made too small. Otherwise, operation of the computer keyboard could not be conveniently performed.

SUMMARY OF THE INVENTION

Therefore, the object of the present invention is to provide a multiple switch assemble which can function as two different keys, thereby permitting a reduction in the total number of computer keys in a computer keyboard so as to permit the installation of a cursor pointing device, such as a micro-joystick, without the need to reduce the size of the conventional computer keys.

Another object of the present invention is to provide a multiple switch assembly which includes a cursor pointing device, such as a micro-joystick, the total space occupied by the computer key being equal to that of two conventional computer keys.

Accordingly, the multiple switch assembly of the present invention comprises: a housing; a switch set including first and second switches mounted spacedly in the housing, each of the first and second switches having a top end with a push button that extends through the housing; a control plate extending above the first and second switches and having a pivot portion mounted pivotally to the housing and a generally V-shaped spring piece. The pivot portion has a pivot axis disposed between the first and second switches. The control plate is operable so as to pivot relative to the housing to depress the push button of a selected one of the first and second switches. The pivot portion divides the control plate into a first plate portion extending above the push button of the first switch and a second plate portion extending above the push button of the second switch. The V-shaped spring piece has a converging part mounted in the housing between the first and second switches and a diverging part with two ends which extend through the housing and which abut a respective one of the first and second plate portions to bias the first and second plate portions of the control plate upwardly.

Preferably, the pivot portion divides the control plate into a first plate portion extending above the push button of the first switch and a second plate portion extending above the push button of the second switch. The multiple switch assembly may additionally comprise a spring piece for biasing the first and second plate portions of the control plate upwardly. In addition, the multiple switch assembly may further comprise a cursor pointing device, such as a micro-joystick, which is mounted in the housing adjacent to the switch set and which has a finger operating surface that extends upwardly through the housing.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
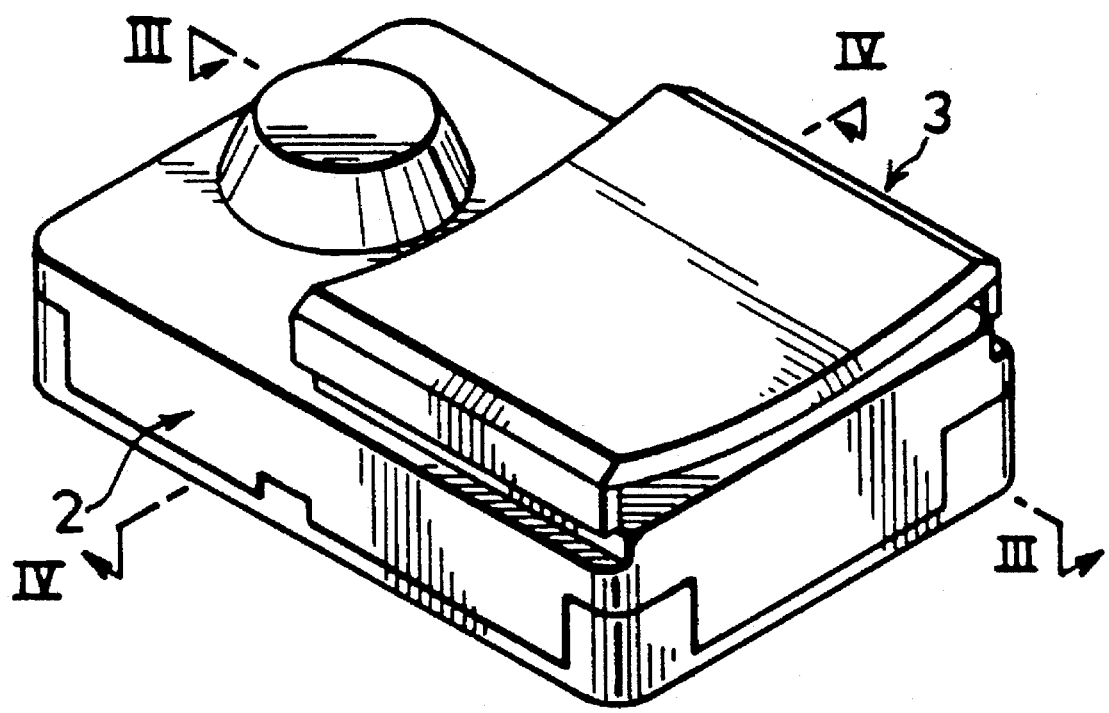
FIG. 1 is a perspective view of the preferred embodiment of a multiple switch assembly according to the present invention.
Figure 2:
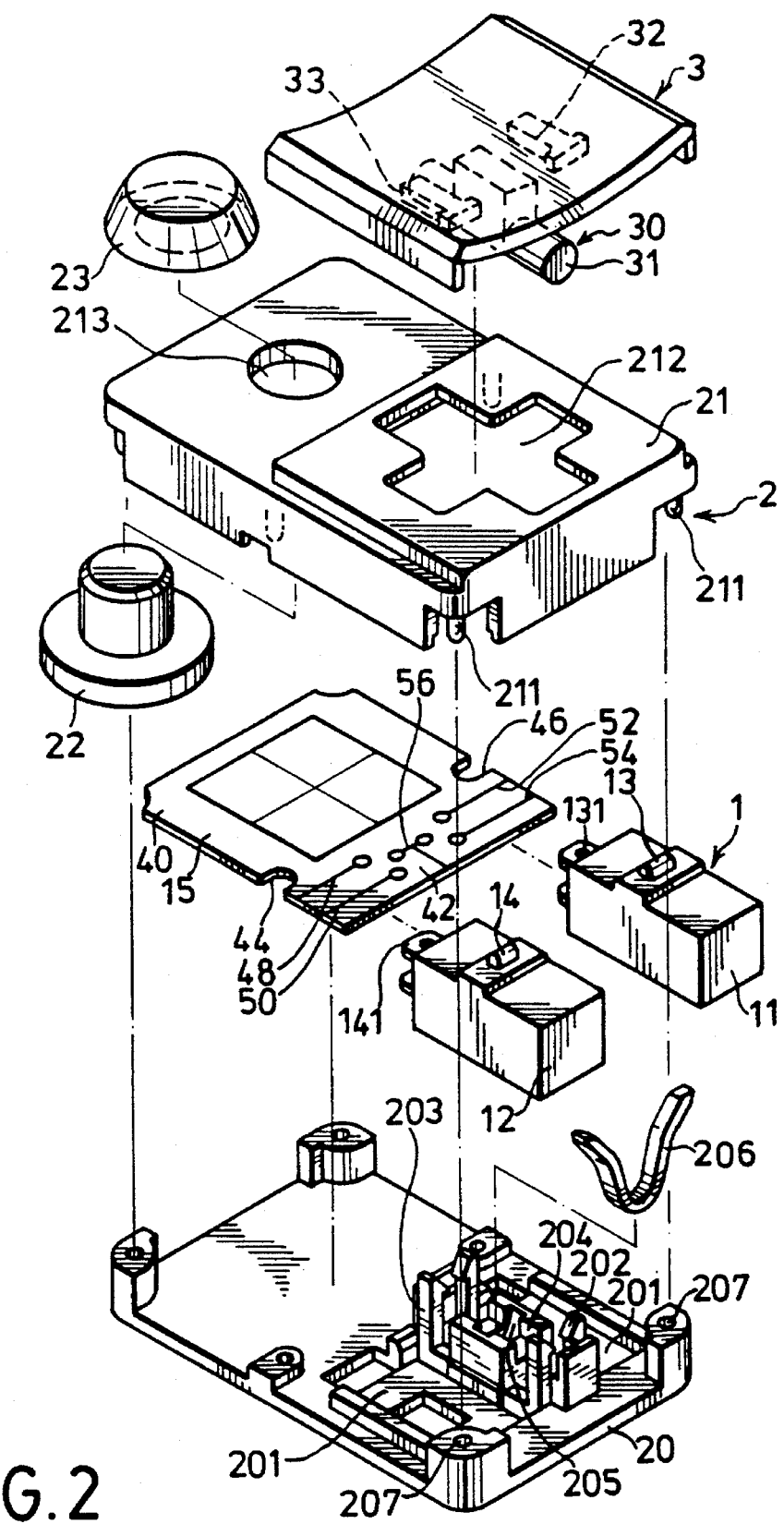
FIG. 2 is an exploded view of the preferred embodiment.
Figure 3:
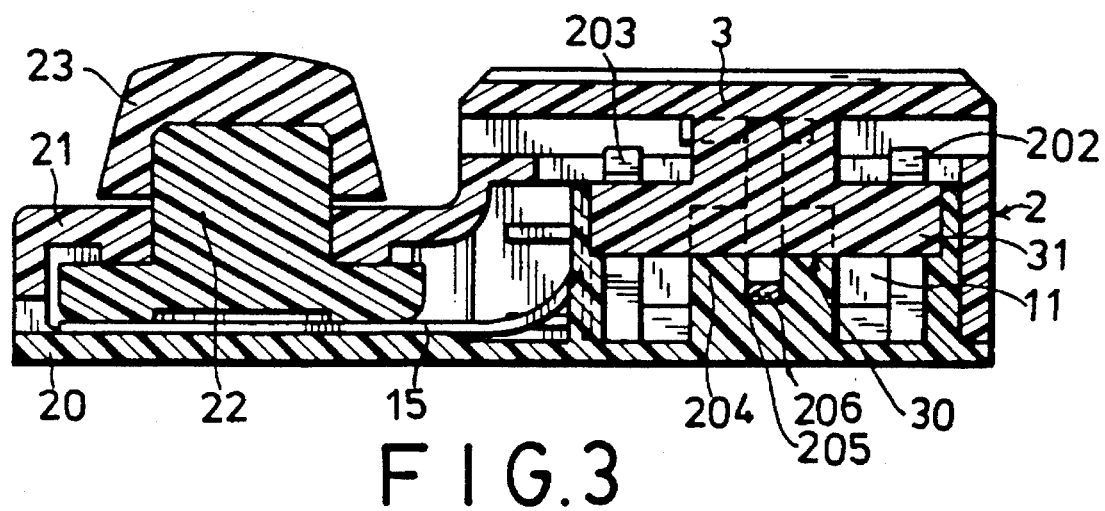
FIG. 3 is a sectional view of the preferred embodiment, taken along line III—III in FIG. 1.

Referring to FIGS. 1 to 3, the preferred embodiment of a multiple switch assembly according to the present invention is shown to comprise a switch set 1, a housing 2 and a control plate 3.

The switch set 1 includes first and second switches 11, 12. Each of the switches 11, 12 has a top end provided with a push button 13, 14. The switches 11, 12 are preferably microswitches commonly found on keyboards which incorporate a cursor pointing device thereon, or on keyboards of a portable computer. The switches 11, 12 preferably serve cursor control functions, such as for moving a cursor to the left or right or for moving the cursor up or down. The switches 11, 12 are connected to a circuit means 15.

As showing in the enclosed FIG. 2, the circuit means 15 includes a first portion 40 that is associated with the micro-joystick 22 and a second portion 42 that is associated with the switches 11, 12. The first portion 40 includes superimposed upper and lower layers that are normally spaced apart that have a respective circuit pattern printed thereon. The quadrant area represents the circuit pattern on the first 40. Operation of the joystick 22, which is disposed on the upper layer of the first portion 40, causes a part of the circuit pattern on the upper layer to contact a part of the circuit pattern on the lower layer, thereby generating electrical signals in a known mannar. The first portion 40 has an end section (not shown) for electrical connection with the circuit of a computer keyboard. The switches 11, 12 are to be mounted on the circuit means 15 at the second portion 42. Referring to FIG. 2 and to FIG. 3, the second portion 42 is folded upwardly with respect to the first portion 40 at notches 44, 46. Slits 48, 50, 52, 54 permit extension of switch contacts 131, 141 of switches 11, 12 therethrough, while circular holes at the end of the slits 48, 50, 52 and 54 facilitate insertion of the switch contacts 131, 141 through slits 48, 50, 52 and 54. The switch contacts 131, 141 are soldered onto the second portion to connect electrically with a circuit pattern (not shown) on the second portion. This circuit pattern extends to the end (not shown) for electrical connection with the circuit of the computer keyboard. To facilitate mounting of the switches 11, 12 on the second portion 42, a transverse slit 56 divides the second portion 42 into a first part which is associated with the switch 11 and a second part which is associated with the switch 12. When mounting the switch 11 to the second portion 42, the first of the second portion 42 is folded upwardly with respect to the second part of the same. The switch contacts 131 are then inserted through the slits 52 and 54 and are soldered onto the second portion 42. The second part of the second portion 42 is then folded upwardly, and the switch contacts 141 are inserted through the slits 48 and 50 and are soldered onto the second portion 42 to complete mounting of the switches 11, 12 on the second portion. The housing 2 includes a base portion 20 and a cover portion 21. The base portion 20 is formed as a rectangular plate with a top surface that is provided with a spaced pair of adjacent receiving grooves 201 for receiving respectively lower ends of the switches 11, 12 therein. Two spaced pairs of oppositely facing hook members 202, 203 project upwardly from the base portion 20 in a space between the receiving grooves 201. A generally U-shaped pivot seat 204 is disposed between the spaced pairs of hook members 202, 203 and confines a pivot groove therein. The pivot seat 204 has an inner wall surface that is formed with an upright generally V-shaped positioning groove 205 for receiving a generally V-shaped spring piece 206 therein. The base portion 20 has four corners formed respectively with an upright mounting socket 207 for engaging four downwardly extending mounting posts 211 on four corners of the cover portion 21, thereby mounting the cover portion 21 on the base portion 20. The cover portion 21 is formed with a cross-shaped first opening 212 which permits the extension of the push buttons 13, 14 of the switches 11, 12 and the two ends of the spring piece 206 therethrough. The cover piece 21 is further formed with a circular second opening 213 on one side of the first opening 212. A cursor pointing device 22 is mounted in the housing 2 adjacent to the switch set 1 and has a finger operating surface that extends upwardly through the second opening 213. In this embodiment, the cursor pointing device 22 is a conventional micro-joystick, and a resilient cap 23 is mounted on the finger operating surface of the cursor pointing device 22 to protect the same.

The control plate 3 extends above the switches 11, 12 and has a pivot portion 30 (see FIGS 3 and 4) mounted pivotally to the housing 2. The pivot portion 30 extends into the housing 2 through the first opening 212 in the cover portion 21 and includes a pivot shaft 31 which is retained pivotally in the pivot groove of the pivot seat 204 by the hook members 202, 203. Since the pivot portion 30 has a pivot axis which is disposed between the switches 11, 12, the control plate 3 can be operated so as to pivot relative to the housing 2 to depress the push button 13, 14 of a selected one of the switches 11, 12.

Preferably, the pivot portion 30 divides the control plate 3 into a first plate portion extending above the push button 13 of the switch 11 and a second plate portion extending above the push button 14 of the switch 12. The two ends of the spring piece 206 abut a respective one of the first and second plate portions to bias the first and second plate portions of the control plate 3 upwardly. Each of the first and second plate portions further has a bottom side which is formed with a switch actuator 32, 33 that abuts the push button 13, 14 of a respective one of the switches 11, 12.

Figure 4:
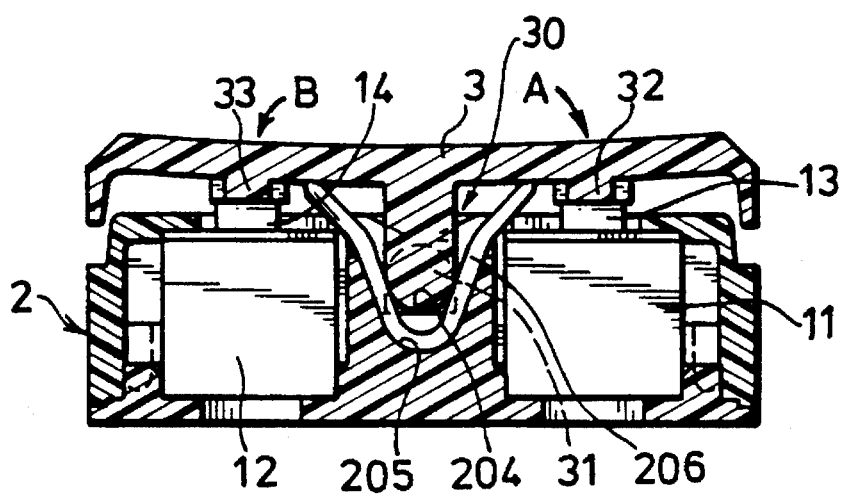
FIG. 4 is a sectional view of the preferred embodiment, taken along line IV—IV in FIG. 1.

Referring to FIG. 4, when pressure is applied on the control plate 3 at the position indicated by the arrow (A), the control plate 3 pivots relative to the housing 2 such that the switch actuator 32 depresses the push button 13 of the switch 11. When the pressure is relieved, the spring piece 206 recoils to return the control plate 3 to its normal position. Based on the same principles, when pressure is applied on the control plate 3 at the position indicated by the arrow (B), the control plate 3 pivots relative to the housing 2 such that the switch actuator 33 depresses the push button 14 of thee switch 12. When the pressure is relieved, the spring piece 206 recoils to return the control plate 3 to its normal position.

Figure 5:
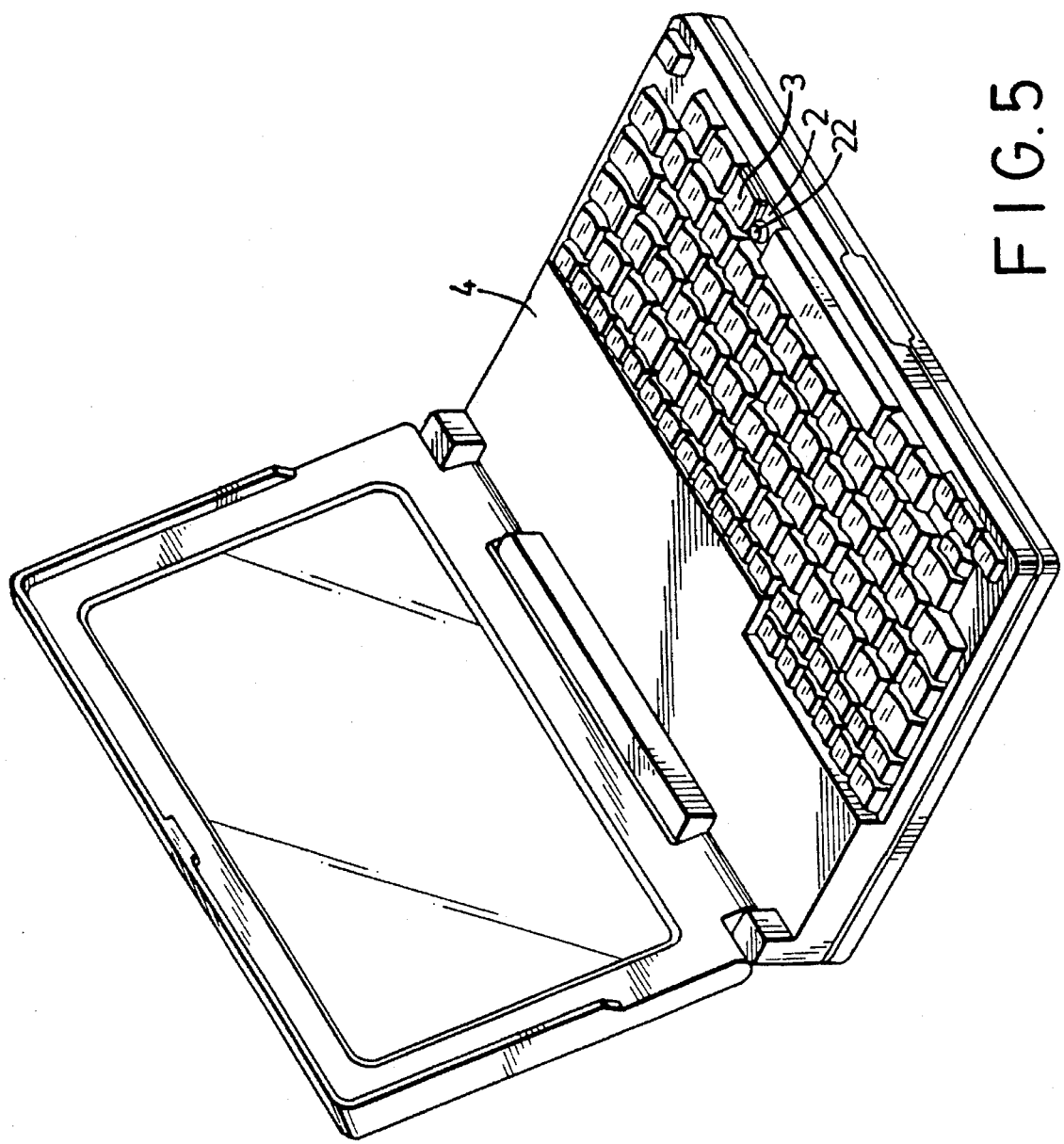
FIG. 5 is a perspective view of a portable computer which incorporates the preferred embodiment of this invention.

It has thus been shown that the multiple switch assembly of the present invention can function as two different computer keys. Referring to FIG. 5, the multiple switch assembly of the present invention permits a reduction in the total number of computer keys in a portable computer 4 so as to permit the incorporation of the cursor pointing device 22 without the need to reduce the size of the conventional computer keys. The cursor pointing device 22 can be operated to control the movement of a cursor on a monitor of the portable computer 4, while the multiple switch assembly of the present invention can serve as an execute key and as an escape key, or as a cursor control key for moving the cursor to the left or right or for moving the cursor up or down, or as a status select key, such as those found in conventional trackball and joystick devices.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A multiple switch assembly, comprising:

a housing;

a switch set including first and second switches mounted spacedly in said housing, each of said first and second switches having a top end with a push button that extends through said housing;

a control plate extending above said first and second switches and having a pivot portion mounted pivotally to said housing, said pivot portion having a pivot axis disposed between said first and second switches, said pivot portion dividing said control plate into a first plate portion extending above said push bottom of said first switch and a second plate portion extending above said push button of said second switch, said control plate being operable so as to pivot relative to said housing to depress said push button of a selected one of said first and second switches; and a generally V-shaped spring piece having a converging part mounted in said housing between said first and second switches and a diverging part with two ends which extend through said housing and which abut a respective one of said first and second plate portions to bias said first and second plate portions of said control place upwardly.

2. The multiple switch assembly as claimed in claim 1, wherein said housing comprises a base portion and a cover portion mounted on said base portion, said base portion having a top surface formed with a spaced pair of adjacent receiving grooves for receiving respectively lower ends of said first and second switches therein.

3. The multiple switch assembly as claimed in claim 2, wherein said base portion is formed with a pivot groove extending between said receiving grooves, said cover portion being formed with an opening to permit said push button of said first and second switches and said two ends of said diverging part of said spring piece to extend therethrough, said pivot portion of said control plate extending into said housing through said opening of said cover portion and including a pivot shaft retained pivotally in said pivot groove.

4. The multiple switch assembly as claimed in claim 3, wherein said base portion is formed with two spaced pairs of oppositely facing hook members which project upwardly and which are disposed between said receiving grooves, and a pivot seat which is disposed between said spaced pairs of hook members and which has said pivot groove formed therein, said hook members engaging said pivot shaft to retain pivotally said pivot shaft in said pivot groove 5. The multiple switch assembly as claimed in claim 4, wherein said pivot seat is further formed with an upright generally V-shaped positioning groove, said converging part of said spring piece being retained in said positioning groove.

6. The multiple switch assembly as claimed in claim 1, wherein each of said first and second plate portions has a bottom side which is formed with a switch actuator that abuts said push button of a respective one of said first and second switches.

7. The computer key as claimed in claim 1, wherein each of said first and second plate portions has a bottom side which is formed with a switch actuator that abuts said push button of a respective one of said first and second switches.

8. The multiple switch assembly as claimed in claim 1, further comprising a cursor pointing device mounted in said housing adjacent to said switch set, said cursor pointing device having a finger operating surface which extends upwardly through said housing.

9. The multiple switch assembly as claimed in claim 8, wherein said cursor pointing device is a micro-joystick.

* * * * *

UNITED STATES PATENT AND TRADEMARK OFFICE
CERTIFICATE OF CORRECTION

PATENT NO. : 5,504,286
DATED : April 2, 1996
INVENTOR(S) : GORDON TSAI

It is certified that error appears in the above-indentified patent and that said Letters Patent is hereby corrected as shown below:

Col. 2, line 45, after "first", insert --portion--

Col. 2, line 61, after "portion", insert --42--

Col. 2, line 62, after "portion", insert --42--

Col. 3, line 2, after "first", insert --part--

Col. 3, line 10, after "portion", insert --42--

Col. 4, line 3, delete "thee", insert --the--.

Signed and Sealed this

Sixteenth Day of July, 1996

Attest:

BRUCE LEHMAN

Attesting Officer     Commissioner of Patents and Trademarks